Patented Oct. 21, 1930

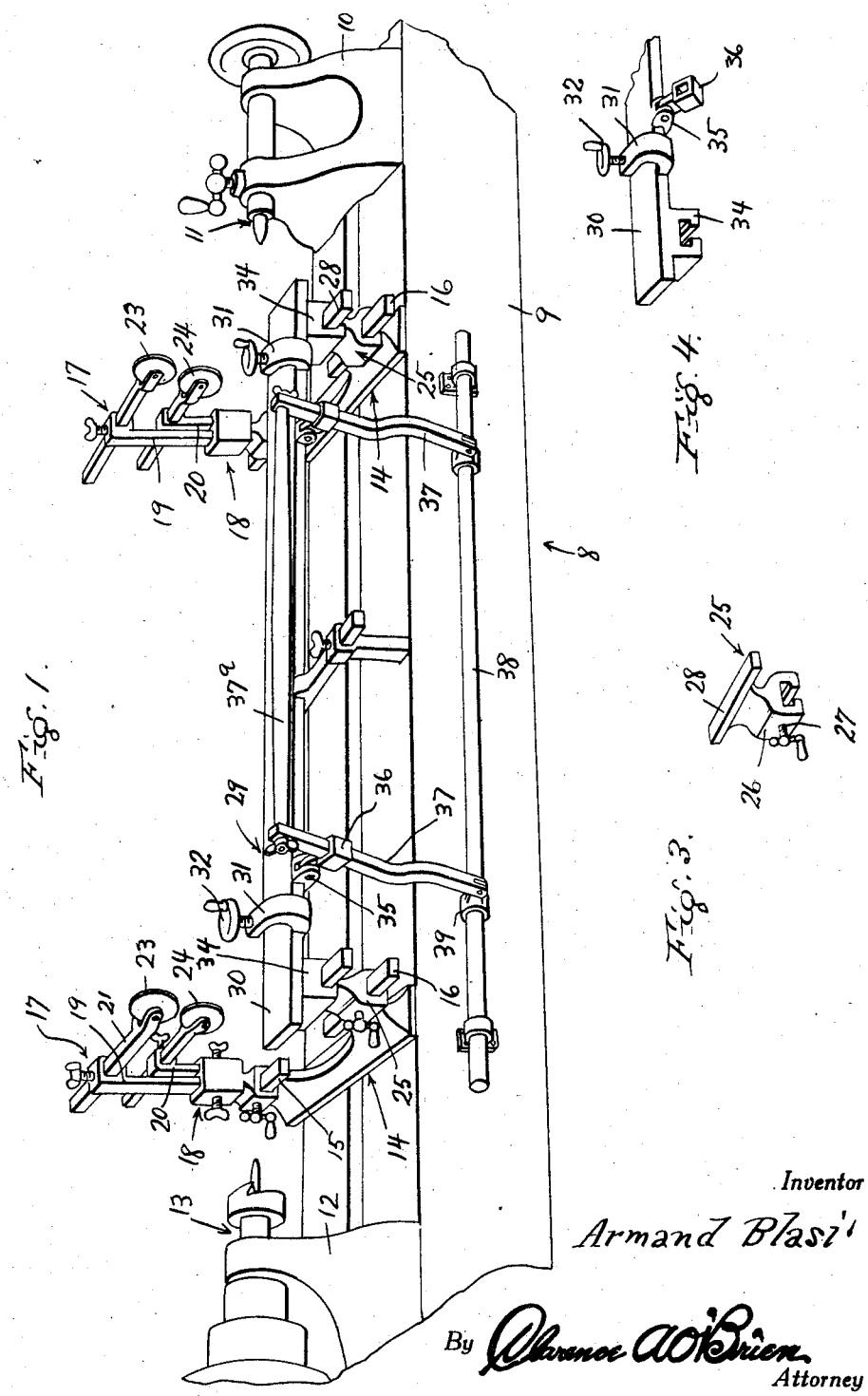

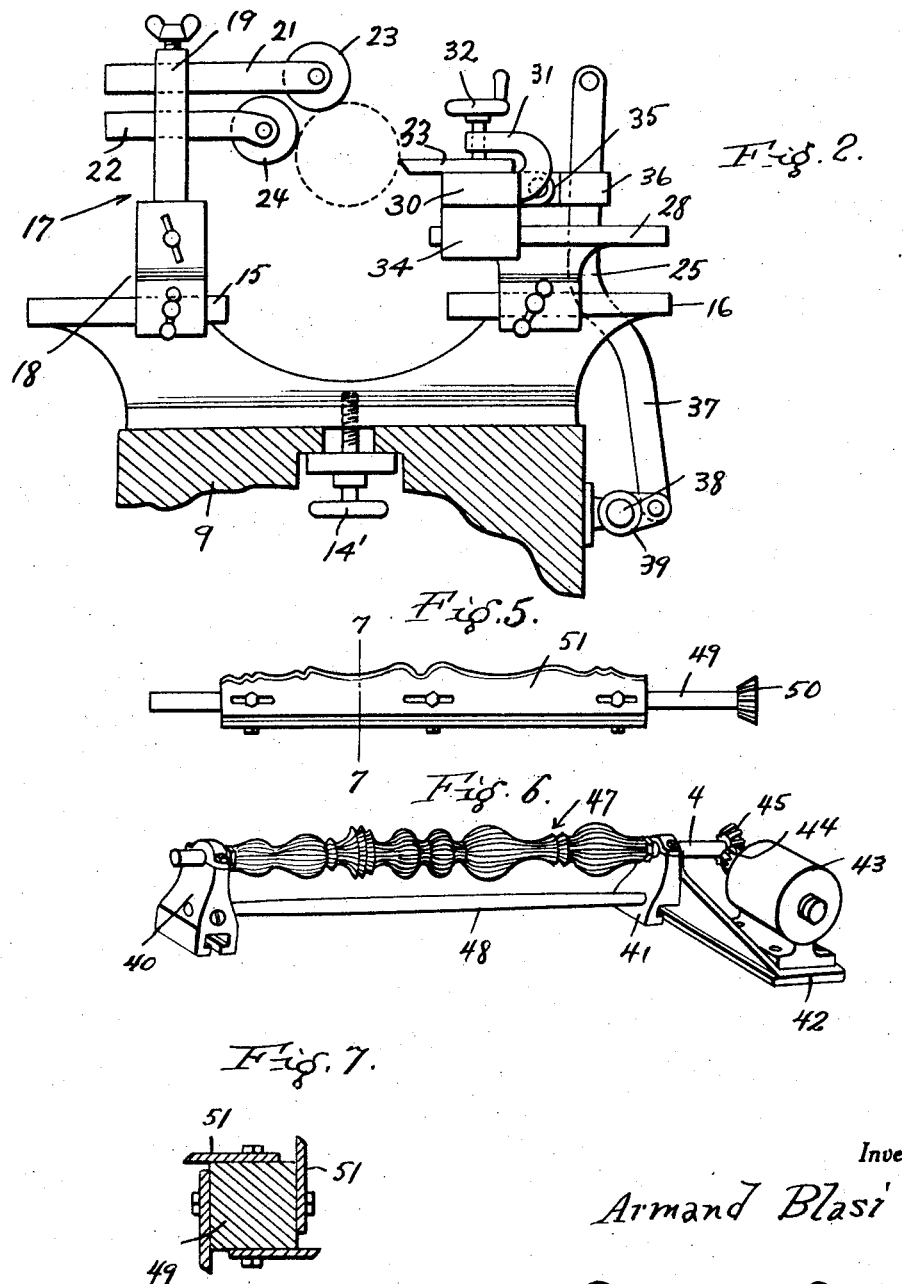

1,779,085

UNITED STATES PATENT OFFICE

ARMAND BLASI, OF NEWARK, NEW JERSEY

WOOD-TURNING LATHE

Application filed April 18, 1929. Serial No. 356,123.

This invention relates to certain new and useful improvements in wood turning lathes and has more particular reference to a tool holding and work guiding means.

One feature of distinction is predicated upon the utilization of novel mounting fixtures attached to the base or bed of the lathe and constructed to accommodate the tool retaining and guiding means as well as the work steadying means.

Another improvement is found in the utilization of novel roller guide devices and adjustable supports therefor which cooperate with and maintain effective bearing surfaces for the stock or work.

A further characteristic of the improved organization is the novel tool clamping vise, together with adjustable means therefor, and a handle structure for moving it toward and from the work.

A still further distinction is the novel adjustably mounted self contained unit or accessory including a rotary cutter, said unit being bodily adjustable on the aforesaid fixtures to promote efficient use and manipulation.

A further feature is a substitute shaft and blade cutter device, which is interchangeable on said rotary cutter unit.

Other features and advantages will become more readily apparent from the following description and drawings.

In the drawings:

Figure 1 is a perspective view of a lathe with the attachment thereon.

Figure 2 is a transverse section through the lathe observing one end of the attachment.

Figure 3 is a perspective view of one of the details.

Figure 4 is a fragmentary perspective view of one end of the tool vise.

Figure 5 is a detail view of a rotary shaft and cutter blade applied thereto.

Figure 6 is a perspective view of the rotary cutter unit.

Figure 7 is a transverse section on the line 7—7 of Figure 5.

Referring now to the drawings and particularly to Figure 1, it will be observed that the lathe is generally designated by the reference character 8, which comprises a bed or base plate 9 having an upright 10 at one end supporting a work engaging spindle device 11.

At the opposite end is a similar upright 12, carrying work engaging and turning means 13. These are the customary details in the lathe construction.

The attachment which is applied to the base comprises a number of accessories or parts. Particular attention is invited to the fixtures generally designated by the reference characters 14. These are in the form of mounting blocks which extend transversely across the base and are fixedly attached thereto in any suitable manner as by a clamp 14'. These fixtures are of the configuration seen in Figure 2 and each one is provided at its opposite ends with heads 15 and 16, providing guide rails. Associated with each rail 15 is a novel guiding device for the work or stock. This device is generally designated by the reference character 17 and comprises a clamping block 18 adjustably mounted on the rail and provided with individually adjustable standards 19 and 20, accommodating the horizontal shanks 21 and 22, respectively. These shanks carry work engaging rollers 23 and 24 respectively. There are two of these devices 17 as is obvious and they engage the opposite end portions of the work adjacent the devices 11 and 13 respectively.

I next invite attention to Figure 3, wherein it will be observed that the reference character 25 designates a detail which may be referred to as a coupling, and this is adapted to be slidably adjusted on the track 16. It comprises a block like clamp 26, having a retaining screw 27 and a miniature rail 28. I employ a pair of these couplings 25 one at each end of the machine.

Associated with these couplings is the manually adjusted tool retaining vise 29. This comprises a horizontal plate 30 having yokes 31 at its opposite end portions provided with retaining screws 32, for the cutting blade 33, as seen in Figure 2. On the under side of the plate and adjacent the opposite ends are blocks 34 formed with grooves receiving the tracks 28. This permits the plate to be shifted toward and from the work in a horizontal plane.

As seen in Figure 1, the outer edge of the plate carries lugs 35, with which a collar 36 is pivotally connected. There are pairs of these lugs and collars. The collar in each instance embraces an arm 37 connected at its upper end with an operating handle 37ª. The arm is in turn pivotally connected at its lower end with a horizontal shaft 38, through the medium of an appropriate connection 39. This handle construction permits the vise to be moved back and forth toward and from the work to gauge the position of the cutting blade 33.

In some instance, instead of employing this horizontally shiftable vise and tool structure, which holds the cutter blade substantially stationary while the work is turned, I provide a rotary cutting unit which includes the cutting tool which rotates simultaneously with the work. Attention is therefore invited to Figure 6, wherein it will be seen that the unit comprises a self contained structure. It embodies supports 40 and 41, constructed to permit them to be mounted on the coupling devices 25. Associated with the support 41 is the base plate 42, for a fractional power electric motor 43. The shaft of this motor is provided with a bevelled gear 44 in mesh with a similar bevelled gear 45 on one end of the tool shaft 46. The support is provided with bearings to accommodate the shaft and the shaft carries an appropriate composite cutting tool 47, which may be of the configuration seen in this figure. The reference character 48 merely designates a handle bar between the supports, which permits the entire unit to be shifted back and forth toward and from the work. It is understood that the tool 47 rotates simultaneously with the work and in a direction opposite thereto for turning purposes. It is proposed to provide substitute cutters for the cutter 47. For instance, as seen in Figure 5, the reference character 49 designates the tool shaft carrying the bevelled gear 50 to be driven from the motor. On the central portion of the shaft are cutting blades 51 of the configuration seen in this figure.

As is also shown in Figure 7 there are a series of four of these blades. These blades are removable so that other types and forms of blades may be substituted therefor. This entire rotary cutting device can be substituted for the one seen in Figure 6, thus making the structure interchangeable.

It is thought that by considering the description in conjunction with the drawings, a clear understanding of the construction, operation, features and advantages will be had. Therefore a more lengthy description will be regarded as unnecessary.

Minor changes in the shape, size and rearrangement of details coming within the field of invention claimed may be resorted to, in actual practice, if desired.

I claim:

1. A combined tool holder and steady rest for wood turning lathes having a bed and longitudinally spaced work supporting and rotating means mounted thereon, a cutter blade supporting means comprising a pair of spaced, transversely disposed base elements mounted on the lathe bed, intermediate the work rotating means and having elongated horizontally disposed heads on their opposite ends, C-clamps adjustably embracing the T-head on one end of the bases, and adapted for longitudinal movement thereon, securing elements for securing the clamp in adjusted positions, horizontally disposed elongated T-heads mounted on the C-clamps, a cutter blade support slidably mounted on the C-clamps, and means for shifting said cutter blade supporting means on said last named T-heads comprising a longitudinally extending supporting rod mounted on the bench, longitudinally spaced levers pivotally mounted on the rod, an actuating handle connected to the levers at their opposite ends, collars slidably mounted on said levers, and co-acting extensions on the collars and the cutter blade support for pivotally connecting the same together.

2. A combined tool holder and steady rest for wood turning lathes having a bed and longitudinally spaced work supporting and rotating means mounted thereon, comprising a pair of spaced, transversely disposed base elements mounted on the lathe bed intermediate the work rotating and supporting means and having elongated, horizontally disposed T-heads on their opposite ends, C-clamps adjustably embracing the T-heads on one end of the bases and adapted for longitudinal movement thereon, securing elements for securing the clamps in adjusted position, horizontally disposed elongated T-heads mounted on the C-clamps, a cutter supporting device slidably mounted on the C-clamps and comprising an elongated flat plate having depending protuberances adjacent its opposite ends provided with recesses for the reception of the T-heads on the C-clamps for slidably mounting the plate thereon and substantially U-shaped clamps on its outer edge for securing a cutter blade on the plate.

In testimony whereof I affix my signature.

ARMAND BLASI.